July 18, 1933.  A. W. WHEATON  1,918,728
INTERNAL EMERGENCY SHUT-OFF VALVE FOR TANKS AND ACTUATING MEANS THEREFOR
Filed Nov. 27, 1931

INVENTOR
Abram W. Wheaton,
BY George D. Richards
ATTORNEY

Patented July 18, 1933

1,918,728

UNITED STATES PATENT OFFICE

ABRAM W. WHEATON, OF MAPLEWOOD, NEW JERSEY, ASSIGNOR TO A. W. WHEATON BRASS WORKS, OF NEWARK, NEW JERSEY, A CORPORATION OF NEW JERSEY

INTERNAL EMERGENCY SHUT-OFF VALVE FOR TANKS AND ACTUATING MEANS THEREFOR

Application filed November 27, 1931. Serial No. 577,662.

This invention relates to improvements in internal emergency shut-off valves for tanks and gravity controlled means for actuating the same.

In the storage of volatile or combustible fluids in tanks, it is highly desirable to afford means to automatically close the discharge outlets of said tanks in the event of occurrence of fire in the vicinity of the latter. With such purpose in view, this invention has for its principal object to provide a novel internal emergency shut-off valve in combination with a gravity controlled actuating means therefor, certain working parts of the latter being housed in a gas-tight casing mounted upon and communicating with the interior of the tank, whereby the normal sealed integrity of tank is maintained, and the escape of gases given off by the content of the tank prevented.

This invention has for a further object to provide a novel gas-tight gravity controlled actuating means for internal emergency shut-off valves of tanks, the gravitatable element of which, however, is externally exposed so as to be subject to normal restraint, in its raised or valve opening position, by means of an external check-tie including a fusible link capable of releasing the same when subjected to abnormal temperature rises.

Other objects of this invention, not at this time more particularly enumerated, will be understood from the following detailed description of the same.

An illustrative embodiment of this invention is shown in the accompanying drawing, in which:—

Figure 1:
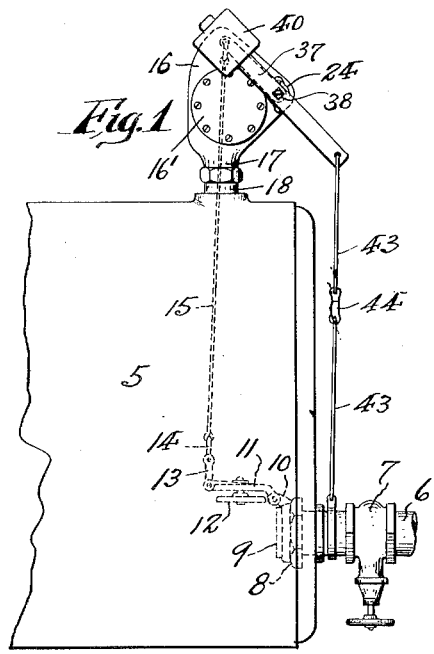
Figure 2:
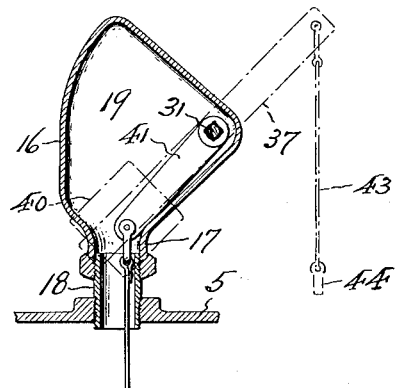
Figure 3:
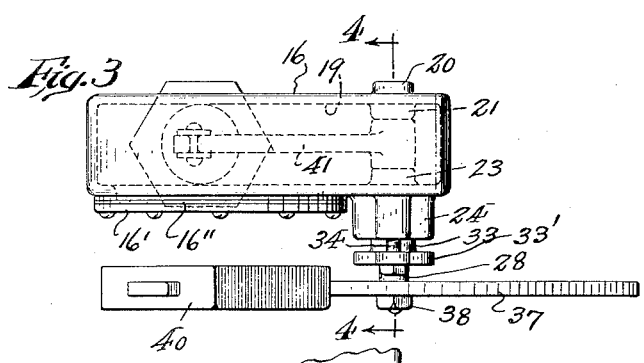
Figure 4:
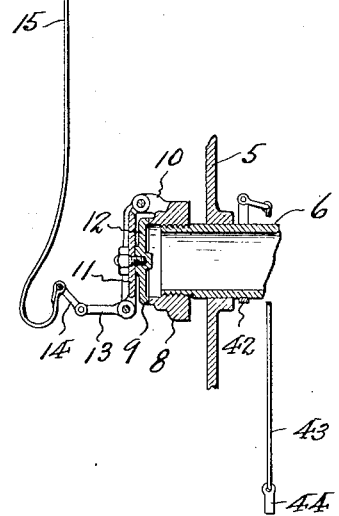
Figure 4:
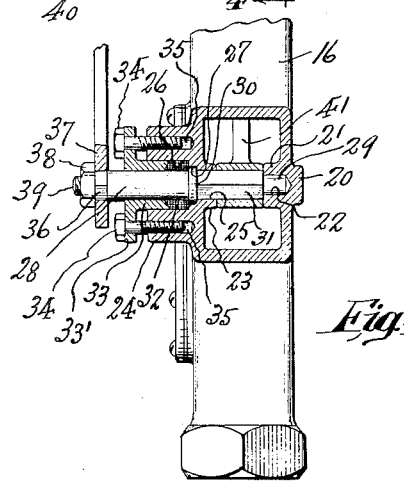

Fig. 1 is a fragmentary side elevation of a storage tank equipped with the internal emergency shut-off valve means and actuating mechanism therefor according to this invention.; Fig. 2 is a fragmentary longitudinal section of the same, drawn on an enlarged scale; Fig. 3 is a top plan view of the valve actuating means and its gas-tight casing, drawn on a further enlarged scale; and Fig. 4 is a transverse vertical section, taken on line 4—4 in said Fig. 3.

Similar characters of reference are employed in the above described views, to indicate corresponding parts.

Referring to said drawing, the reference character 5 indicates any suitable construction of storage tank, having an outlet pipe 6 entered through a wall thereof so as to communicate with its interior. Connected in the exterior portion of said outlet pipe is a manually controlled gate valve 7.

Engaged on the interior end of said outlet pipe 6, preferably by being threaded thereon, is an internal emergency valve device, comprising a body 8 having an annular seat portion 9. Connected with the upper side of said body 8 is a fulcrum lug or ear 10. Pivotally connected with said lug or ear 10 is a frame 11 to which is suitably attached a valve member 12 to cooperate with said seat portion 9 of the body 8. Suitably connected with the free end of said frame 11 is an arm 13, to the free end of which is in turn connected a coupling link or loop 14 for attaching the lower end of a flexible pull cable 15 with said frame 11.

The gravity controlled actuating means for the internal emergency shut-off valve, comprises a hollow casing 16, having at its lower end an internally threaded neck 17. Said casing is connected in upstanding relation to the tank 5 by a nipple 18 which is threaded into the neck 17, and the lower end of which is entered through the wall of the tank, thus connecting the interior chamber 19 of said casing 16 in communication with the tank interior, and preferably at a point vertically spaced above the location of said internal emergency shut-off valve. Said casing 16 is preferably shaped to provide transversely disposed bearing means laterally offset from the vertical axis of the casing and its neck 17. This bearing means comprises a thrust bearing boss 20 intergrally formed in connection with one side wall of the casing; said boss including an internal extension 21 in which is formed a thrust bearing seat 22. Integrally formed in connection with the opposite side wall of said casing is an internal bearing boss 23 and an externally disposed or exteriorly projecting enlarged boss 24. Formed in said internal bearing boss 23 is a bearing opening 25, and formed in said exterior boss 24 is an axially aligned outwardly open stuffing-box chamber 26 of enlarged diameter. Intermediate said bearing opening 25 and stuffing-box chamber 26 is an annular seat 27.

The reference character 28 indicates a spindle, having at one end a journal portion 29 of reduced diameter. Said spindle is passed inwardly through said stuffing-box chamber 26 and bearing opening 25, so as to extend transversely through the interior of the casing 16 with its journal portion 29 engaged in the thrust bearing seat 22. Said spindle is provided with an annular diametrically enlarged shoulder 30 adapted to seat on said seat 27. Intermediate said shoulder 30 and said journal portion 29, the spindle is provided with a section 31 of square or polygonal cross section. Engaged in the stuffing-box chamber 26 is a suitable packing 32 which surrounds the exteriorly extending portion of the spindle; the inner end of said packing abutting the shoulder 30. Engaged in said stuffing-box chamber behind the packing 32 is a gland 33 having a flanged outer end 33', through which extend fastening bolts 34 which screw into internally threaded openings 35 provided in the boss 24, thereby securing the gland in packing retaining relation to the stuffing-box. The exteriorly projecting free end of said spindle is provided with a squared end 36, upon which is mounted a lever member 37; the latter being retained in secured relation to the spindle by means of a nut 38 engaged on a threaded stud 39 formed in connection with the free outer end of the spindle. Fixed upon the forwardly extending arm of said lever member 37 is a weight 40.

Mounted on the squared section 31 of the spindle, within the interior 19 of the casing 16 is a lever arm 41. The pull cable 15, connected with hinged frame of the internal emergency shut-off valve, extends upwardly through the tank interior and through the nipple 18 into the interior 19 of the casing 16, and is connected with the free end of said lever arm 41.

Suitably anchored to a point exteriorly of the tank, as to the outlet pipe 6 by means of the encircling anchor yoke 42, is a tie member 43, the upper end of which is connected with the rearwardly extending arm of said lever member 37. The length of said tie-member is separably divided by a fuse-link element 44. The tie member 43 is of such length as to hold the rearward arm of the lever member 37 downwardly swung and the forward weighted arm upwardly swung. This position of the lever member 37 raises and holds the lever arm 41, within the casing 16, to and in up-swung normal position, thus pulling upward the pull cable 15 to swing upward the frame 11 and valve member 12, whereby the internal emergency shut-off valve is normally maintained in open condition (see Fig. 1).

It will be obvious that, owing to the provision of the casing 16 with its internally enclosed lever arm 41, and including the gas tight bearing provided for the spindle 28 through the agency of the stuffing-box structure, the mechanism controlling the emergency shut-off valve may be employed without risk of the escape of gases or fumes given off by the content of the tank, thus eliminating losses due to evaporation and also preventing the venting of dangerous or combustible gases from the tank. In order to give access to the interior of the casing 16, when assembling the control mechanism and coupling the same with the pull cable 15, one side wall of said casing is provided with an opening normally closed by a cover-plate 16' and sealing gasket 16". Said cover-plate may be secured in closed relation to the casing 16 by screws or any other convenient form of fastening means.

In the event of fire occurring in the vicinity of the storage tank 5, the heat thereof will react upon the fuse-link element 44 to cause a separation thereof with consequent parting of the tie member 43, thereby freeing the lever member 37 from restraint. When thus freed, the weight 40, under gravity will swing down the lever member thereby turning the spindle 28 and consequently swinging downward the lever arm 41 within the casing 16. The downward swinging of the lever arm 41 relaxes the pull-cable 15 and thus allows the frame 11 to swing downwardly relative to the body 8 of the emergency shut-off valve, whereby the valve member 12 is carried into closed engagement with the seat portion 9 of the body 8 (see Fig. 2). The pressure of the fluid against the thus closed valve member 12 will maintain the closed position thereof, so that discharge of the content of the tank through the outlet pipe 6 will immediately cease, regardless of whether the external gate-valve 7 is closed or not. It will be obvious that such automatic action of the emergency shut-off valve will immediately shut-off the tank, thus eliminating risks of loss, and minimizing additional fire hazards.

I am aware that many changes could be made in the above described mechanisms as well as in the details of the construction thereof, without departing from the scope of this invention as defined in the appended claims; it is therefore intended that all matter contained in the above description or shown in the accompanying drawing shall be interpreted as illustrative and not in a limiting sense.

I claim:—

1. In a storage tank having an outlet, an emergency shut-off valve connected with said outlet within the tank adjacent to its lower end portion, and actuating means for said valve comprising a closed gas-tight casing exteriorly mounted on top of said tank substantially in vertical alignment with said shut-off valve with its interior communicating with the tank interior, a transverse spindle journaled in and between the walls of said casing and having an exteriorly projecting end, a stuffing-box means through which said exterior spindle end projects, a lever arm fixed on said spindle within said casing, a pull cable extending from the interior of said casing into said tank interior and connected between said lever arm and the operative element of said shut-off valve to normally hold the latter in open position, a weighted lever member fixed on the exterior end of said spindle, and an exterior partable tie-member including a fusible link for normally holding said weighted lever member raised subject to gravitation for the purposes described.

2. In combination with a storage tank having an internal emergency shut-off valve adjacent to its lower of a gravity actuated valve control means comprising, a gas-tight chambered casing exteriorly mounted on the top of said tank substantially in vertical alignment with said shut-off valve and in communication with the interior of said tank, a spindle journaled in said casing, said casing having a stuffing-box means through which an exterior end of said spindle projects, a weighted lever means on the exterior end of said spindle, a valve controlling lever arm on the interior end of said spindle, and means exteriorly of the tank to normally retain said weighted lever means upraised against gravitational operation to normally hold said shut-off valve in open condition.

3. Means for controlling an internal emergency shut-off valve of a storage tank, comprising a gas-tight chambered casing having an internally threaded neck, a nipple coupling said neck to said tank to connect said casing interior in communication with the interior of said tank above said shut-off valve, a spindle journaled in said casing, said casing having a stuffing-box means through which an end of said spindle may project exteriorly of said casing, a valve controlling lever on the interior end of said spindle, an internal pull means between said lever and valve, an operating lever on the exterior end of said spindle, said operating lever having oppositely extending arms, one arm having a weight, and a partable tie-member including a fusible link connected with the other arm to hold the weight upraised against gravitation to normally maintain said valve in open condition.

ABRAM W. WHEATON.